United States Patent
Matsuura

(10) Patent No.: US 12,049,113 B2
(45) Date of Patent: Jul. 30, 2024

(54) MOTORCYCLE TIRE

(71) Applicant: Sumitomo Rubber Industries, Ltd., Kobe (JP)

(72) Inventor: Kota Matsuura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/202,135

(22) Filed: May 25, 2023

(65) Prior Publication Data

US 2023/0406041 A1    Dec. 21, 2023

(30) Foreign Application Priority Data

Jun. 15, 2022    (JP) ................................ 2022-096799

(51) Int. Cl.
*B60C 9/20* (2006.01)
*B60C 9/22* (2006.01)

(52) U.S. Cl.
CPC ................. *B60C 9/20* (2013.01); *B60C 9/22* (2013.01); *B60C 2009/2016* (2013.01); *B60C 2009/2019* (2013.01); *B60C 2009/2022* (2013.01); *B60C 2009/2093* (2013.01); *B60C 2200/10* (2013.01)

(58) Field of Classification Search
CPC ..... B60C 2200/10; B60C 9/22; B60C 9/2204; B60C 2009/2214; B60C 2009/2022
See application file for complete search history.

(56) References Cited

U.S. PATENT DOCUMENTS

| | | | |
|---|---|---|---|
| 5,562,792 A * | 10/1996 | Caretta | B29D 30/08 152/533 |
| 6,601,378 B1 * | 8/2003 | Fritsch | D02G 3/28 57/244 |
| 9,522,572 B2 | 12/2016 | Oshima | |
| 2005/0241741 A1 * | 11/2005 | Nakagawa | B60C 9/0007 152/531 |
| 2006/0144490 A1 | 7/2006 | Tanaka | |

(Continued)

FOREIGN PATENT DOCUMENTS

| | | | | |
|---|---|---|---|---|
| EP | 3050721 | * | 12/2017 | |
| EP | 2363305 B1 | * | 9/2018 | B60C 9/2204 |

(Continued)

OTHER PUBLICATIONS

Extended European Search Report for European Application No. 23174088.7, dated Oct. 25, 2023.

*Primary Examiner* — Justin R Fischer
(74) *Attorney, Agent, or Firm* — Birch, Stewart, Kolasch & Birch, LLP

(57) ABSTRACT

A motorcycle tire comprises a carcass and a tread reinforcing layer. The tread reinforcing layer comprises a belt and a band. The band is composed of a jointless band ply having a developed width less than 65% of the developed tread width. The belt is composed of at least one belt ply having a developed width of 65% or more of the developed tread width. At first positions, the intersecting angle between the belt cords and the carcass cords is 20 to 60 degrees. In the tread portion in a tire meridional cross sectional view, a single arc passing through a point on the tread surface at the tire equator and two points on the tread surface at the tread edges has a radius of not more than 0.7 times the maximum tire cross-section width.

8 Claims, 3 Drawing Sheets

(56) References Cited

U.S. PATENT DOCUMENTS

2009/0308515 A1* 12/2009 Matsunaga ......... B60C 11/0302
  152/209.18
2017/0203611 A1    7/2017 Morozumi

FOREIGN PATENT DOCUMENTS

| | | |
|---|---|---|
| EP | 2 583 838 B1 | 1/2019 |
| JP | 3-96403 * | 4/1991 |
| JP | 10-114203 A | 5/1998 |
| JP | 2004-155379 A | 6/2004 |
| JP | 4441333 B2 | 3/2010 |
| JP | 5753554 B2 | 7/2015 |
| WO | WO 2013/122222 * | 8/2013 |

* cited by examiner

MOTORCYCLE TIRE

BACKGROUND OF THE INVENTION

Field of the Invention

The present disclosure relates to a motorcycle tire.

Background Art

Patent Document 1 below discloses a motorcycle tire comprising a carcass, a belt, and an auxiliary belt. In this motorcycle tire, angles of cords of the auxiliary belt are specifically defined, and thereby, it is explained as being improved in grip performance and handle stability performance, while maintaining uneven wear resistance performance.

Patent Document 1: Japanese Patent No. 5753554

SUMMARY OF THE INVENTION

Problems to be Solved by the Invention

In recent years, as the performance of motorcycles has improved, tires therefor are also required to have further improved turning or cornering performance, while maintaining straight-running stability performance.

The present disclosure was made in view of the situation as described above, and a primary objective of the present disclosure is to provide a motorcycle tire capable of exhibiting excellent turning or cornering performance, while maintaining straight-running stability performance.

Means for Solving the Problems

According to the present disclosure, a motorcycle tire comprises:
  a tread portion having a tread surface between a pair of tread edges,
  a toroidal carcass comprising at least one carcass ply of carcass cords,
  a tread reinforcing layer disposed radially outside the carcass in the tread portion,
  the tread reinforcing layer comprising a band and a belt,
  the band comprising a jointless band ply of one or more band cords wound spirally and circumferentially of the tire at an angle of not more than 5 degrees with respect to the tire circumferential direction, the jointless band ply being centered on the tire equator, and having a developed width of less than 65% of a developed width of the tread portion,
  the belt comprising one or more belt plies of parallel belt cords, the one or more belt plies being centered on the tire equator, and having a developed width of not less than 65% of the developed tread width,
wherein
  at a first position axially inwardly spaced apart from each tread edge by a developed distance of 10% to 15% of the developed tread width,
an intersecting angle between the belt cords and the carcass cords is in a range from 20 to degrees, and
  in a meridional cross section of the tire, including the tire rotation axis, under its a normal state, a single-radius circular arc passing through a point on the tread surface at the tire equator and two points on the tread surface at the tread edges has a radius of not more than 0.7 times a section width of the tire.

Effects of the Invention

By adopting the above configuration, the motorcycle tire according to the present disclosure can exhibit excellent turning or cornering performance while maintaining straight-running stability performance.

DETAILED DESCRIPTION OF THE INVENTION

Embodiments of the present disclosure will now be described in detail in conjunction with the accompanying drawings.

Figure 1:
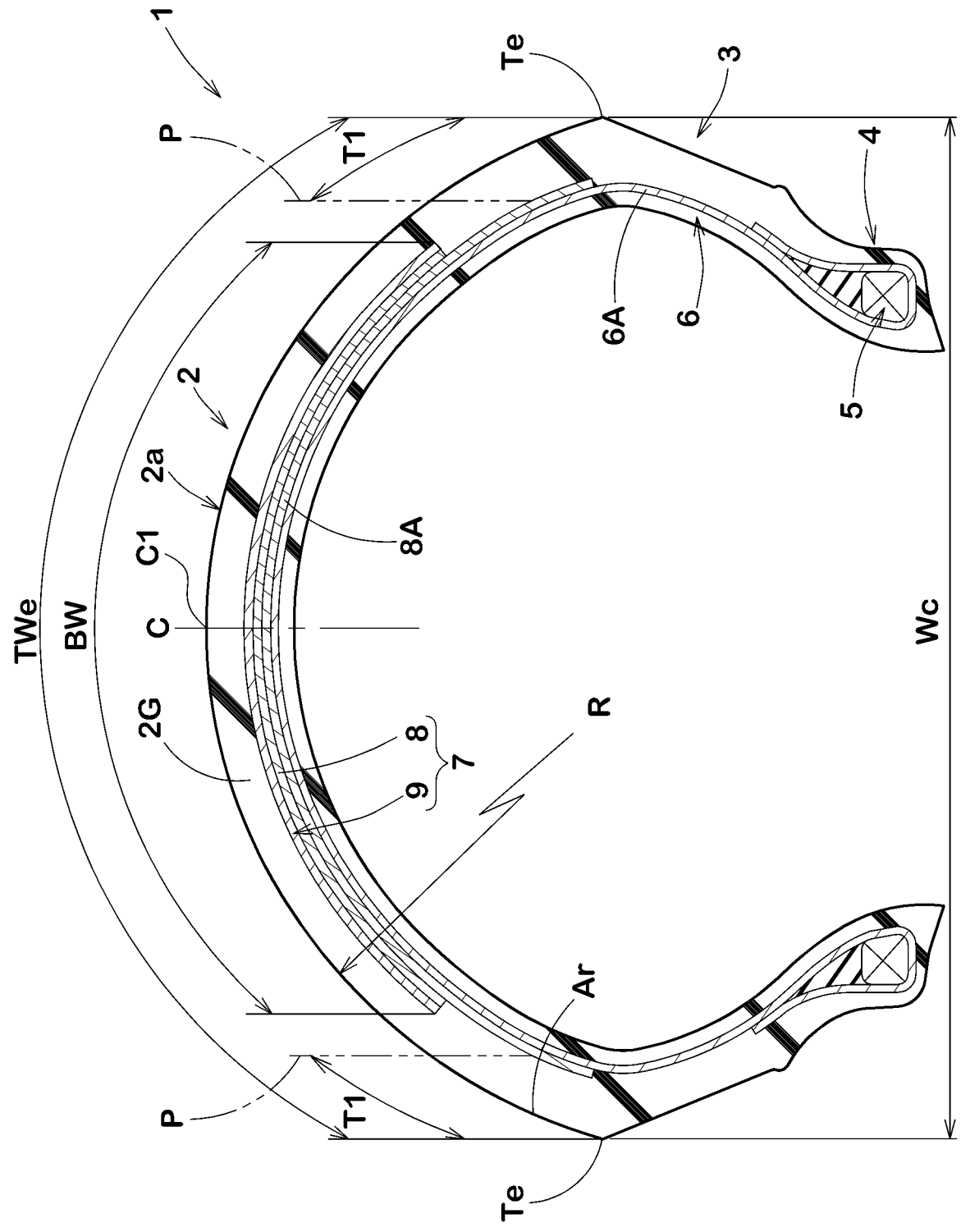
FIG. 1 is a meridional cross sectional view showing a motorcycle tire as an embodiment of the present disclosure.

FIG. 1 is a meridional cross sectional view of a pneumatic tire 1 for motorcycles as an embodiment of the present disclosure under its normal state.

The present disclosure is suitably applied to a pneumatic tire for motorcycles used in sports categories intended for circuit running although the present disclosure is not limited to tires for such categories of motorcycles.

The "normal state" is a state of a tire which is mounted on a normal rim, and inflated to a normal internal pressure, but loaded with no tire load.

In this specification, dimensions, positions and the like regarding a tire are referred as those under the normal state of the tire, unless otherwise noted.

The "normal rim" is a wheel rim specified for the tire by a standard included in a standardization system on which the tire is based, for example, the "normal wheel rim" in JATMA, "Design Rim" in TRA, and "Measuring Rim" in ETRTO.

The "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 in the present embodiment comprises a tread portion 2 having a pair of tread edges Te, a pair of axially spaced bead portions 4, a pair of sidewall portions 3 extending between the tread edges Te and the bead portions 4, a toroidal carcass 6 extending between the bead portions 4 through the tread portion 2 and the sidewall portions 3, a tread reinforcing layer 7 disposed radially outside the carcass 6 in the tread portion 2, and a tread rubber 2G disposed radially outside the tread reinforcing layer 7 and forming the radially outer surface of the tread portion 2.

The tread surface 2a which is the radially outer surface of the tread portion 2, extends between the tread edges Te, and curves in an arc shape convexly toward the radially outside so as to be able to turn at large camber angles.

Incidentally, the tread edges Te are the axially outermost ends of the tread portion 2 which may contact with the ground when the camber angle is maximized. As the tread portion 2 is relatively largely curved, the axial distance between the tread edges Te is equal to the maximum cross-section width Wc of the tire.

The developed tread width TWe is the length measured between the tread edges Te along the curved tread surface 2a.

The tire equator C is positioned at the center in the tire axial direction between the tread edges Te.

As shown in FIG. 1, in the meridional cross section of the tire under its normal state, a circular arc (Ar) having a single radius and passing through three points: a point C1 on the tread surface 2a at the tire equator, and two points on the tread surface 2a at the respective tread edges Te, has a radius R of not more than 0.7 times the maximum tire cross-section width Wc. The tread portion 2 is so configured.

Such radius R facilitates leaning (inclining) of the tire 1, and improves the handleability when making turning or cornering from straight running.

If the radius R exceeds 0.7 times the maximum tire cross-section width Wc, the centripetal force due to the camber thrust may be insufficient for the centrifugal force, and the vehicle may not be sufficiently leant.

In the meridional cross section, the tread surface 2a is almost entirely located on the arc (Ar), namely overlaps therewith, or the tread surface 2a partially overlaps with the arc (Ar) and the rest is located radially inside the arc (Ar). In other words, the tread surface 2a is not located radially outside the arc (Ar).

Such tread surface 2a exerts an effect of obtaining a greater camber thrust force.

In order to effectively derive such advantageous effect, the radius R of the arc (Ar) is preferably not more than 0.60 times, more preferably not more than 0.55 times the maximum tire cross-section width Wc.

On the other hand, if the radius R of the arc (Ar) is excessively small, the straight-running stability performance may be deteriorated.

Therefore, the radius R of the arc (Ar) is preferably not less than 0.40 times, more preferably not less than 0.45 times the maximum tire cross-section width Wc.

Figure 2:
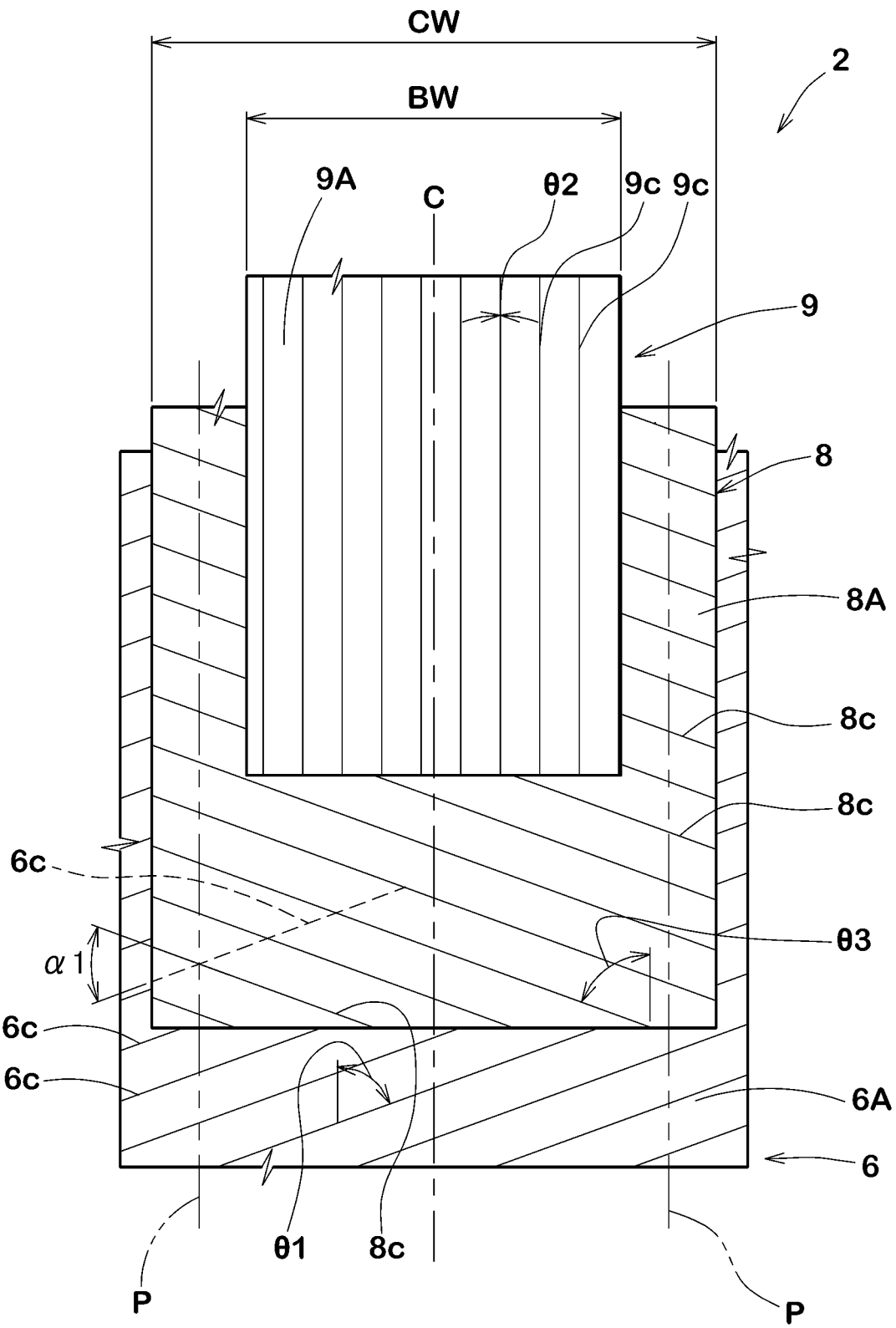
FIG. 2 is a developed partial view showing the tread reinforcing layer and the carcass of the motorcycle tire.

FIG. 2 is a developed partial view showing the tread reinforcing layer 7 and the carcass 6 in the tread portion 2 of the present embodiment.

The carcass 6 is composed of at least one, in the present embodiment, only one carcass ply 6A of carcass cords 6c arranged side by side as shown in FIGS. 1 and 2. The carcass 6 may be composed of two carcass plies (not shown), for example.

The tread reinforcing layer 7 of the present embodiment includes a belt 8 and a band 9.

The band 9 in the present embodiment is composed of a jointless band ply 9A in which one or more band cords 9c are spirally wound at an angle θ2 of not more than 5 degrees with respect to the tire circumferential direction.

Such band 9 effectively prevents the outer diameter of the tire from increasing when the tire 1 rotates at high speed, and provides basic straight-running stability performance.

On the other hand, as the lateral rigidity of the jointless band ply 9A is relatively low, even if the jointless band ply 9A exists in the ground contact area of the tire during turning or cornering, an improvement in cornering power by the jointless band ply can not be expected.

Therefore, the developed width BW of the jointless band ply 9A is set to be 65% or less of the developed tread width TWe, centering on the tire equator C in order to prevent the jointless band ply 9A from entering in the ground contact area during turning or cornering as much as possible.

In order to ensure this, the developed width BW is preferably not more than 60%, more preferably not more than 55% of the developed tread width TWe.

However, if the developed width BW of the jointless band ply 9A is excessively small, the effect of suppressing the increase in the tire outer diameter cannot be expected. Therefore, the developed width BW of the jointless band ply 9A is preferably not less than 35%, more preferably not less than 40% of the tread developed tread width TWe.

The belt 8 is composed of at least one, in the present embodiment, only one belt ply 8A of parallel belt cords 8c. The belt cords 8c of the belt 8 are inclined at an angle larger than the cord angle of the band 9, therefore, the belt 8 has higher lateral rigidity than the band 9.

This is advantageous for improving cornering power during turning or cornering. Therefore, in order that the belt ply 8A can be positioned in the ground contact area during turning or cornering, the belt ply 8A is configured to have a developed width CW of not less than 65% of the developed tread width TWe, centering on the tire equator C.

At a pair of first positions P on both sides of the tire equator, which are axially inwardly spaced apart from the tread edges Te, respectively, by a distance T1 of 10% to 15% of the developed tread width TWe, the tread portion tends to have a strong effect on the turning or cornering performance. Here, the distance T1 is the length measured along the curved tread surface 2a, and the first positions P are on the curved tread surface 2a.

Therefore, in order that the carcass cords 6c are tightly hooped and high lateral rigidity can be obtained at the first positions P, the intersecting angle α1 between the carcass cords 6c and the belt cords 8c at the first positions P is set in a range from 20 to 60 degrees.

As a result, a large cornering power can be obtained during turning or cornering, and handle controllability can be improved during cornering at large camber angles.

If the intersecting angle α1 is less than 20 degrees, or if the intersecting angle α1 exceeds 60 degrees, the hooping effect may become insufficient.

Preferably, the intersecting angle α1 is not less than 30 degrees, more preferably not less than 35 degrees, but not more than 50 degrees, more preferably not more than 45 degrees.

In order to effectively derive the above-described effects, the angle θ1 of the carcass cords 6c with respect to the tire circumferential direction is preferably set to be not less than 60 degrees, more preferably not less than 65 degrees, but not more than 90 degrees, more preferably not more than 80 degrees.

It is preferable that the carcass cord 6c is configured to have such a characteristic that a load at 3% elongation is not less than 20 N, more preferably not less than 50 N, in the load-elongation curve of the carcass cord 6c.

Such carcass cord 6c can exert a strong hoop effect, while ensuring flexible deformation of the toroidal carcass 6, which helps smooth leaning of the tire 1 and improves the cornering performance.

The load at 3% elongation of the carcass cord 6c is preferably not more than 500 N, more preferably not more than 350 N.

In this specification, the load at 3% elongation of a cord is measured according to the test method for "Load at Constant elongation" defined in JIS L1017 "Test methods for chemical fiber tire cords".

It is preferable that the elongation at break of the carcass cord 6c is in a range from 3% to 15%. Such carcass cord 6c has flexibility in itself, so the carcass cords 6c can be arranged at a substantially similar position to the arc (Ar).

In this specification, the elongation at break is measured according to the tensile test defined in JIS L1017 "Test methods for chemical fiber tire cords". The test is performed by elongating a cord sample of 250 mm length at a rate of 300+/−20 mm/minute, and the elongation percentage of the cord sample when cut or broken is obtained.

Preferably, the carcass cord 6c is an organic fiber cord made of polyethylene terephthalate, polyamide, rayon, or the like. As a result, an increase in the mass of the tire 1 is suppressed, so the easiness of leaning is maintained.
Steel cords are not preferable as the carcass cords 6c.

The belt 8 is disposed radially inside the band 9.
Since the band 9 is positioned more closely to the road surface than the belt 8, the band 9 more affects running performance. As a result, the effect of suppressing the increase in the tire outer diameter during straight running by the band 9 is maintained, so excellent straight-running stability performance is exhibited.

It is preferable that the developed width CW of the belt 8 or the belt ply 8A in this embodiment is set in a range from 70% to 95% of the developed tread width TWe in order that the tightening effect on the carcass 6 is greatly exhibited, and the excessive increase in tread rigidity in tread edge portions can be avoided.

It is preferable that the load at 3% elongation of the belt cord 8c is greater than the load at 3% elongation of the carcass cord 6c.
As described above, in the tire 1 according to the present disclosure, the load at 3% elongation of the belt cord 8c located more closely to the road surface during running is relatively increased, therefore, a greater hoop effect can be obtained.
Preferably, the load at 3% elongation of the belt cord 8c is not less than 60 N, more preferably not less than 100 N, but, not more than 500 N, more preferably not more than 350 N in the load-elongation curve.

It is preferable that the belt cord 8c is an organic fiber cord made of polyethylene terephthalate, polyamide, rayon, or the like. Steel cords are not preferable as the belt cord 8c.

The angle θ3 of the belt cords 8c with respect to the tire circumferential direction is preferably not less than 60 degrees, more preferably not less than 70 degrees.

It is preferable that the direction of inclination of the belt cords 8c with respect to the tire circumferential direction is opposite to the direction of inclination of the carcass cords 6c with respect to the tire circumferential direction.

The elongation at break of the band cord 9c is preferably in a range from 3% to 15%.
As the elongation at break of the band cord 9c is not more than 15%, the effect of suppressing the increase of the tire outer diameter is highly exhibited.
Since the elongation at break of the band cord 9c is not less than 3%, flexible deformation of the tire 1 is ensured, and decrease in driving force and braking force is suppressed.
Preferably, the band cord 9c is an organic fiber cord made of polyethylene terephthalate, polyamide, rayon, or the like. Also steel cords may be used as the band cord 9c.

Figure 3:
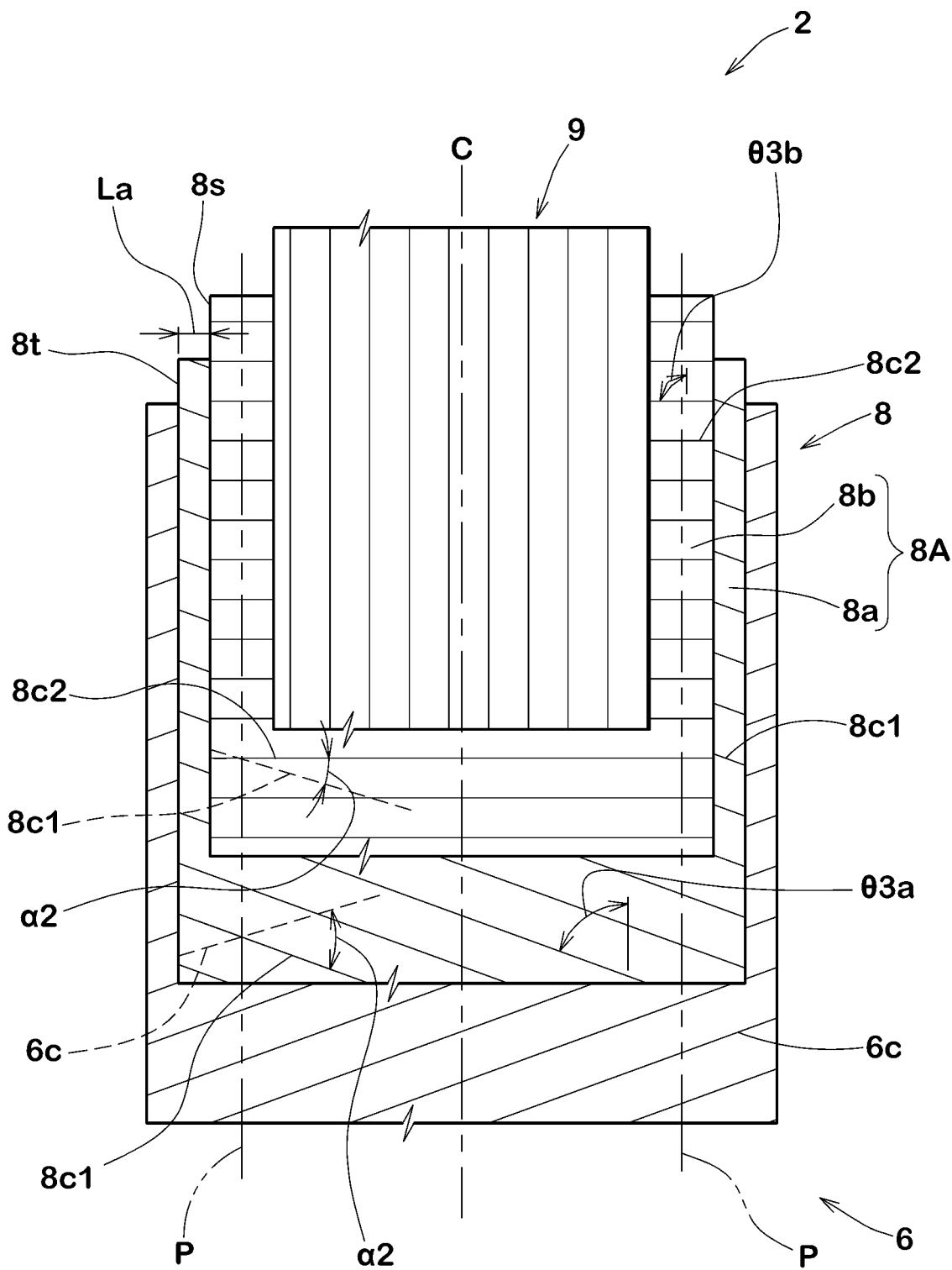
FIG. 3 is a developed partial view showing the tread reinforcing layer and the carcass of another embodiment of the present disclosure.

FIG. 3 is a developed partial view showing the tread reinforcing layer 7 and the carcass 6 in the tread portion 2 of a tire as another embodiment of the present disclosure.

The same reference numerals are given to the same components as in the former embodiment, and the redundant descriptions thereof are omitted.

In this embodiment, the belt ply 8A includes a radially inner belt ply 8a and a radially outer belt ply 8b disposed on the radially outside of the radially inner belt ply 8a.

In general, the smaller the intersecting angle between cords (preferably about 10 to 20 degrees), the greater the hoop effect.
This effect is greatly exhibited by the tread reinforcing layer 7 adjacent to the road surface during running.

In the present embodiment, since the radially outer belt ply 8b is positioned outermost in the tire radial direction at the first positions P, it is preferable that, at the first positions P, the intersecting angle α2 between the belt cords 8c1 of the radially inner belt ply 8a and the belt cords 8c2 of the radially outer belt ply 8b is not more than, more preferably smaller than the intersecting angle α1 between the belt cords 8c1 of the radially inner belt ply 8a and the carcass cords 6c.

The intersecting angle α2 is preferably not less than 20 degrees, more preferably not less than 25 degrees, but, preferably not more than 60 degrees, more preferably not more than 55 degrees.

It is preferable that the angle θ3b of the belt cords 8c2 of the radially outer belt ply 8b with respect to the tire circumferential direction is larger than the angle θ3a of the belt cords 8c1 of the radially inner belt ply 8a with respect to the tire circumferential direction. Preferably, the angle θ3b is not less than 80 degrees, more preferably not less than 85 degrees. As a result, there can be expected such an effect that the hooping effect when leaning becomes higher than the hooping effect when upright.

It is preferable that the axially outer edges 8s of the radially outer belt ply 8b are respectively displaced in the tire axial direction from the axially outer edges 8t of the radially inner belt ply 8a, in order that a step difference in the rigidity of the tread portion 2 becomes smaller, and thereby smooth turning becomes possible.
The developed length La between each of the axially outer edges 8s of the radially outer belt ply 8b and the adjacent one of the axially outer edges 8t of the radially inner belt ply 8a measured along the tread surface 2a is preferably not less than 2%, more preferably not less than 3%, but preferably not more than 7%, more preferably not more than 6% of the developed tread width TWe.
In the present embodiment, the axially outer edges 8s of the radially outer belt ply 8b are respectively positioned axially inward of the axially outer edges 8t of the radially inner belt ply 8a.

It is preferable that the band 9 is located radially outside the belt 8.
As the band 9 is located on the radially outermost side in the tread reinforcing layer 7, the effect of improving the straight-running stability performance by the band 9 is highly exhibited, and the ease of handling from straight running to cornering is improved.
If the band 9 is disposed radially inward of the belt 8, the effect of suppressing the increase of the tire outer diameter becomes small, although the belt 8 may exert an effect of improving the shear stress during straight running, While detailed description has been made of preferable embodiments of the present disclosure, the present disclosure can be embodied in various forms without being limited to the illustrated embodiments.

Comparison Tests

Based on the structure shown in FIG. 1, motorcycle tires of size 90/80R17 for front tire and 120/70R17 for rear tire, were experimentally manufactured as test tires (comparative example tires Ref 1-Ref 3 and working example tires Ex. 1-Ex. 12). Specifications thereof are listed in Table 1.

The test tires were attached to the front and rear wheels of a test vehicle (250 cc motorcycle), and the front and rear tires were inflated to 220 kPa and 200 kPa, respectively. The motorcycle was run on a dry asphalt road of a test course by a test rider, and the roll responsiveness, cornering stability and transient characteristic were evaluated by the test rider into ten ranks where the comparative example tire Ref. 1 is 5, and the higher rank number is better.

The roll responsiveness is the easiness of making the transition from straight running to cornering.

The cornering stability is the stability during cornering at large camber angles.

The transient characteristic is the easiness of running when the camber angle is changed. The test results are shown in Table 1 and Table 2, wherein
- "A" means that the belt ply or the radially inner belt ply is located radially inside the band;
- "B" means that the belt ply or the radially inner belt ply is located radially outside the band;
- "C" means that the radially outer belt ply is located radially inside the band;
- "D" means that the radially outer belt ply is located radially outside the band.

TABLE 1

| Tire | Ref. 1 | Ref. 2 | Ref. 3 | Ex. 1 | Ex. 2 | Ex. 3 | Ex. 4 | Ex. 5 |
|---|---|---|---|---|---|---|---|---|
| BW/TWe(%) | 70 | 70 | 70 | 65 | 55 | 45 | 55 | 55 |
| α1 (deg.) | 15 | 15 | 15 | 40 | 40 | 40 | 20 | 60 |
| R/Wc(%) | 60 | 60 | 60 | 60 | 60 | 60 | 60 | 60 |
| Number of belt ply | 1 | 1 | 1 | 1 | 1 | 1 | 1 | 1 |
| θ1 (deg.) | 75 | 70 | 70 | 70 | 70 | 70 | 90 | 70 |
| θ3 or θ3a(deg.) | 90 | 70 | 70 | 70 | 70 | 70 | 70 | 50 |
| θ3b (deg.) | — | — | — | — | — | — | — | — |
| Position of belt ply | B | A | A | A | A | A | A | A |
| α2 (deg.) | — | — | — | — | — | — | — | — |
| radially outer belt ply position | — | — | — | — | — | — | — | — |
| carcass cord load at 3% elongation (N) | 55 | 55 | 55 | 60 | 60 | 60 | 60 | 60 |
| belt cord load at 3% elongation (N) | 20 | 20 | 20 | 20 | 20 | 20 | 20 | 20 |
| band cord breaking elongation (%) | 2 | 2 | 2 | 7 | 7 | 7 | 7 | 7 |
| roll responsiveness | 5 | 4 | 3 | 7 | 7 | 7 | 6 | 8 |
| cornering stability | 5 | 4 | 4 | 7 | 7 | 6 | 8 | 8 |
| transient characteristic | 5 | 4 | 4 | 8 | 6 | 7 | 7 | 8 |

TABLE 2

| Tire | Ex. 6 | Ex. 7 | Ex. 8 | Ex. 9 | Ex. 10 | Ex. 11 | Ex. 12 |
|---|---|---|---|---|---|---|---|
| BW/TWe(%) | 55 | 55 | 55 | 55 | 55 | 55 | 55 |
| α1 (deg.) | 40 | 40 | 40 | 40 | 40 | 40 | 40 |
| R/Wc(%) | 60 | 60 | 60 | 60 | 60 | 60 | 60 |
| Number of belt ply | 2 | 2 | 2 | 2 | 2 | 2 | 2 |
| θ1 (deg.) | 70 | 70 | 70 | 90 | 70 | 70 | 70 |
| θ3 or θ3a(deg.) | 70 | 70 | 70 | 60 | 70 | 70 | 70 |
| θ3b (deg.) | 90 | 90 | 70 | 60 | 90 | 90 | 90 |
| Position of belt ply | A | A | A | A | A | A | A |
| α2 (deg.) | 20 | 20 | 40 | 60 | 20 | 20 | 20 |
| radially outer belt ply position | D | C | C | C | C | C | C |
| carcass cord load at 3% elongation (N) | 60 | 60 | 60 | 60 | 180 | 180 | 180 |
| belt cord load at 3% elongation (N) | 20 | 20 | 20 | 20 | 20 | 180 | 180 |
| band cord breaking elongation (%) | 7 | 7 | 7 | 7 | 7 | 7 | 2 |
| roll responsiveness | 8 | 8 | 7 | 6 | 9 | 10 | 9 |
| cornering stability | 8 | 8 | 7 | 9 | 9 | 10 | 9 |
| transient characteristic | 8 | 9 | 8 | 7 | 9 | 10 | 6 |

From the test results, it was confirmed that, as compared to the comparative example tires, the working example tires exhibited superior turning or cornering performance, and the straight-running stability performance was maintained since the band had a developed width BW of not less than 45% of the developed tread width TWe.

Statement of the Present Disclosure

The present disclosure is as follows.

Disclosure 1. A motorcycle tire comprising:
- a tread portion having a tread surface between a pair of tread edges,
- a toroidal carcass comprising at least one carcass ply of carcass cords,
- a tread reinforcing layer disposed radially outside the carcass in the tread portion,
- the tread reinforcing layer comprising a band and a belt,
- the band comprising a jointless band ply of one or more band cords wound spirally and circumferentially of the tire at an angle of not more than 5 degrees with respect to the tire circumferential direction, the jointless band ply being centered on the tire equator, and having a developed width of less than 65% of a developed width of the tread portion,
- the belt comprising one or more belt plies of parallel belt cords, the one or more belt plies being centered on the tire equator, and having a developed width of not less than 65% of the developed tread width, wherein
- at a first position axially inwardly spaced apart from each tread edge by a developed distance of 10% to 15% of the developed tread width, an intersecting angle between the belt cords and the carcass cords is in a range from 20 to 60 degrees, and
- in a meridional cross section of the tire, including the tire rotation axis, under its normal state, a single-radius circular arc passing through a point on the tread surface at the tire equator and two points on the tread surface at the tread edges has a radius of not more than 0.7 times a section width of the tire.

Disclosure 2. The motorcycle tire according to Disclosure 1, wherein the belt ply includes a radially inner belt ply located radially inside the band.

Disclosure 3. The motorcycle tire according to Disclosure 2, wherein the belt ply further includes a radially outer belt ply located radially outside the radially inner belt ply, and at the first positions, an intersecting angle between the belt cords of the radially inner belt ply and the belt cords of the radially outer belt ply is smaller than an intersecting angle between the belt cords of the radially inner belt ply and the carcass cords.

Disclosure 4. The motorcycle tire according to Disclosure 3, wherein the intersecting angle between the belt cords of the radially inner belt ply and the belt cords of the radially outer belt ply at the first position, is in a range from 20 to 60 degrees.

Disclosure 5. The motorcycle tire according to any one of Disclosures 1-4, wherein the band is positioned radially outside the belt.

Disclosure 6. The motorcycle tire according to any one of Disclosures 1-5, wherein a load at 3% elongation of each carcass cord is not less than 20 N in its load-elongation curve.

Disclosure 7. The motorcycle tire according to any one of Disclosures 1-6, wherein a load at 3% elongation of each belt cord is not less than 60 N in its load-elongation curve.

Disclosure 8. The motorcycle tire according to any one of Disclosures 1-7, wherein an elongation at break of each carcass cord is in a range from 3% to 15%.

Disclosure 9. The motorcycle tire according to any one of Disclosures 1-8, wherein an elongation at break of each band cord is in a range from 3% to 15%.

DESCRIPTION OF THE REFERENCE SIGNS 1 motorcycle tire
2a tread surface
6 carcass
6c carcass cord
7 tread reinforcing layer
8 belt
8A belt ply
8c belt cord
9 band
9A jointless band ply
Ar circular arc
BW developed width of jointless band ply
C1 tire equator
CW developed width of belt ply
P first position
R radius
Wc maximum tire cross-section width
Te tread edge
TWe developed tread width

The invention claimed is:

1. A motorcycle tire comprising:
a tread portion having a tread surface between a pair of tread edges,
a toroidal carcass comprising at least one carcass ply of carcass cords,
a tread reinforcing layer disposed radially outside the carcass in the tread portion,
the tread reinforcing layer comprising a band and a belt,
the band comprising a jointless band ply of one or more band cords wound spirally and circumferentially of the tire at an angle of not more than 5 degrees with respect to the tire circumferential direction, the jointless band ply being centered on the tire equator, and having a developed width of less than 65% of a developed width of the tread portion,
the belt comprising a plurality of belt plies of parallel belt cords, the plurality of belt plies being centered on the tire equator, and having a developed width of not less than 65% of the developed tread width, wherein the the plurality of belt plies include a radially inner belt ply located radially inside the band, and a radially outer belt ply located radially outside the radially inner belt ply,
wherein
the band is positioned radially outside the radially outer belt ply;
at a first position axially inwardly spaced apart from each tread edge by a developed distance of 10% to 15% of the developed tread width:
the carcass cords are inclined with respect to the belt cords of the radially inner belt ply to a first direction at a first angle α2 in a range from 20 to 60 degrees;
the belt cords of the radially outer belt ply are inclined with respect to the belt cords of the radially inner belt ply to the first direction at a second angle α2 in a range from 20 to 60 degrees;
the second angle α2 is smaller than the first angle α2;
the carcass cords are inclined at an angle θ1 in a range from 60 to 80 degrees with respect to the tire circumferential direction;
the belt cords of the radially outer belt ply are inclined at an angle θ3b of not less than 85 degrees with respect to the tire circumferential direction; and
in a meridional cross section of the tire, including the tire rotation axis, under its a normal state, a single-radius circular arc passing through a point on the tread surface at the tire equator and two points on the tread surface at the tread edges has a radius of not more than 0.7 times a section width of the tire.

2. The motorcycle tire according to claim 1, wherein a load at 3% elongation of each carcass cord is not less than 20 N in its load-elongation curve.

3. The motorcycle tire according to claim 1, wherein a load at 3% elongation of each belt cord is not less than 60 N in its load-elongation curve.

4. The motorcycle tire according to claim 1, wherein an elongation at break of each carcass cord is in a range from 3% to 15%.

5. The motorcycle tire according to claim 1, wherein an elongation at break of each band cord is in a range from 3% to 15%.

6. The motorcycle tire according to claim 1, wherein
a load at 3% elongation of each carcass cord is not less than 20 N in its load-elongation curve,
a load at 3% elongation of each belt cord is not less than 60 N in its load-elongation curve,
an elongation at break of each carcass cord is in a range from 3% to 15%, and
an elongation at break of each band cord is in a range from 3% to 15%.

7. The motorcycle tire according to claim 6, wherein axially outer edges of the radially outer belt ply are respectively positioned axially inward of axially outer edges of the radially inner belt ply.

8. The motorcycle tire according to claim 1, wherein axially outer edges of the radially outer belt ply are respectively positioned axially inward of axially outer edges of the radially inner belt ply.

* * * * *